United States Patent
Yun

(10) Patent No.: US 12,503,094 B2
(45) Date of Patent: Dec. 23, 2025

(54) COUPLING STRUCTURE OF BALL NUT AND DAMPER AND HYDRAULIC SUPPLY APPARATUS EMPLOYING THE SAME

(71) Applicant: HL MANDO CORPORATION, Gyeonggi-do (KR)

(72) Inventor: Dong Jin Yun, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/647,826

(22) Filed: Apr. 26, 2024

(65) Prior Publication Data
US 2024/0360852 A1   Oct. 31, 2024

(30) Foreign Application Priority Data
Apr. 26, 2023   (KR) .................. 10-2023-0054607

(51) Int. Cl.
| | | |
|---|---|---|
| B60T 13/74 | (2006.01) | |
| B60T 13/16 | (2006.01) | |
| B60T 17/00 | (2006.01) | |
| F16D 65/00 | (2006.01) | |
| F16H 57/00 | (2012.01) | |
| F16H 25/22 | (2006.01) | |

(52) U.S. Cl.
CPC .......... *B60T 13/746* (2013.01); *B60T 13/16* (2013.01); *B60T 13/745* (2013.01); *B60T 17/008* (2013.01); *F16D 65/0006* (2013.01); *F16H 57/0006* (2013.01); *B60Y 2306/09* (2013.01); *B60Y 2400/81* (2013.01); *F16H 25/2204* (2013.01)

(58) Field of Classification Search
CPC ...... B60T 13/746; B60T 13/16; B60T 13/745; B60T 17/008; F16D 65/0006; F16H 57/0006; F16H 25/2204; B60Y 2306/09; B60Y 2400/81
See application file for complete search history.

(56) References Cited

U.S. PATENT DOCUMENTS

| | | | |
|---|---|---|---|
| 7,562,594 B2 * | 7/2009 | Nagai ................. | F16H 25/2015 188/134 |
| 11,285,931 B2 * | 3/2022 | Lee ......................... | B60T 13/66 |
| 11,511,722 B2 * | 11/2022 | Boehm ................... | B60T 17/08 |
| 11,987,221 B2 * | 5/2024 | Hong ....................... | G01D 5/12 |

FOREIGN PATENT DOCUMENTS

| | | | |
|---|---|---|---|
| KR | 10-2022-0005909 | 1/2022 | |
| KR | 20220005909 | * 1/2022 | ............. B60T 13/16 |

* cited by examiner

*Primary Examiner* — Dustin T Nguyen
(74) *Attorney, Agent, or Firm* — WOMBLE BOND DICKINSON (US) LLP

(57) ABSTRACT

In a hydraulic supply apparatus, one or more fitting grooves are formed along the outer circumferential surface of a ball nut, and corresponding fitting protrusions are formed on the inner circumferential surface of a damper coupled to the ball nut. This configuration minimizes damper movement, thereby reducing vibration and noise caused by collision with a bushing member during axial movement of the ball nut.

12 Claims, 8 Drawing Sheets

100

COUPLING STRUCTURE OF BALL NUT AND DAMPER AND HYDRAULIC SUPPLY APPARATUS EMPLOYING THE SAME

CROSS-REFERENCE TO RELATED APPLICATIONS

This application claims benefit and priority to Korean Patent Application No. 10-2023-0054607, filed on Apr. 26, 2023, with the Korean Intellectual Property Office, the disclosure of which is incorporated herein in its entirety by reference.

TECHNICAL FIELD

The present disclosure relates to a coupling structure of a ball nut and a damper and a hydraulic supply apparatus employing the same, and more particularly, to a coupling structure of a ball nut and a damper for suppressing vibration and noise caused by collision with a bushing member generated while the ball nut is moved in the axial direction of the screw by minimizing the movement of the damper, and a hydraulic supply apparatus employing the same.

BACKGROUND

Recently, the development of hybrid vehicles, fuel cell vehicles, and electric vehicles is actively underway to improve fuel efficiency and reduce exhaust gases.

Such vehicles are essentially provided with braking devices, that is, vehicle braking devices. Such a vehicle brake device refers to a device that functions to reduce a running vehicle or stop the vehicle.

Typical vehicle brake devices include vacuum brakes that generate braking forces using suction pressure of the engine and hydraulic brakes that generate braking forces using hydraulic pressure.

A vacuum brake is a device that makes it possible to exert a large braking force with a small force in a vacuum booster by using a pressure difference between the suction pressure and atmospheric pressure of the vehicle engine and generates a much larger output than the force applied to the pedal when the driver presses the brake pedal.

In an electronic brake system which is a kind of hydraulic brake, when the driver presses the pedal, the electronic control unit (ECU) detects the pedal pressing, a hydraulic generator is operated to generate hydraulic pressure, and thus, a braking operation is performed.

That is, when the driver presses the brake pedal, a pedal displacement sensor detects the displacement of the brake pedal, and the hydraulic supply apparatus operates by the signal of the electronic control unit, thereby causing braking of a wheel cylinder.

Such an electronic brake system includes a hydraulic supply apparatus that outputs the operation of the brake pedal as an electrical signal through the pedal displacement sensor to operate a motor and converts the rotational force of the motor into a linear motion to generate a braking hydraulic pressure, a hydraulic pressure block provided with a plurality of valves to receive the hydraulic pressure generated by the hydraulic pressure supply device to control the braking operation, a pedal simulator that provides the reaction force to the pedal, and an electronic control unit that controls the motor and the valves.

FIG. 1 is a cross-sectional view of one embodiment of a hydraulic supply apparatus according to the related art, and FIG. 2 is a view showing a state in which a screw, a ball nut, a piston, and a rotation prevention member are combined in the hydraulic supply apparatus of FIG. 1

A hydraulic supply apparatus 100 includes a screw 110 rotatably provided by a motor, a ball nut 120 provided to be forwarded and retracted by rotation of the screw 110, a piston 130 provided to be forwarded and retracted together with the ball nut 120 to provide hydraulic pressure, a bushing member 140 provided on the outside of the ball nut 120 to be fixed to the modulator block 60, and a rotation prevention member 150 coupled to the outside of the ball nut 120 to be supported in the rotation direction by the bushing member 140 to prevent the rotation of the ball nut 120.

The screw 110 is provided to receive the rotational force by the motor and rotate, and the screw thread engageable with the screw groove of the ball nut 120 is formed on the outer circumferential surface of the screw 110.

The ball nut 120 is screwed to the screw 110 to convert the rotational motion of the screw 110 into a linear motion to enable advancement and retraction.

FIG. 3 is a view showing a rotation prevention member in the hydraulic supply apparatus of FIG. 1, and FIG. 4 is a view showing a state in which the rotation prevention member of FIG. 3 is viewed from the front.

The rotation prevention member 150 may be coupled to the outside of the ball nut 120 to prevent the rotation of the ball nut 120.

The rotation prevention member 150 is provided in a cylindrical shape and is coupled to the outside of the ball nut 120 to prevent the ball nut 120 from rotating by the bushing member 140, thereby preventing the ball nut 120 from rotating together when the screw 110 rotates.

The ball nut 120 may be inserted into the inner side of the rotation prevention member 150, and the inner circumferential surface of the rotation prevention member 150 may be closely attached on the outer circumferential surface of the ball nut 120.

In this case, the rotation prevention member 150 may be coupled to one end portion of the ball nut 120 to support the end portion of the piston 130 coupled to the other end portion of the ball nut 120 in the longitudinal direction.

However, in conventional hydraulic supply apparatus, vibration and noise are generated due to the collision between the ball nut and a bushing member as the ball nut moves axially along the screw.

PRIOR ART LITERATURE (Patent Literature 1) Korean Patent Publication No. 10-2022-0005909 A

SUMMARY

The present disclosure has been made to solve the various problems of the related art, and it is an object of the present disclosure to provide a coupling structure of a ball nut and a damper for suppressing vibration and noise caused by collision with a bushing member generated while the ball nut is moved in the axial direction of the screw by minimizing the movement of the damper and a hydraulic supply apparatus employing the same.

In order to achieve the above objective of the present disclosure, there is provided a hydraulic supply apparatus including: a screw rotatably provided by receiving a rotational force generated by a motor, a ball nut threadedly coupled to the screw to move linearly along an axial direction of the screw through rotation of the screw; a piston coupled to the ball nut to move linearly together with the ball nut to generate hydraulic pressure; a bushing member provided between the piston and a rotor and having one end portion fixed to a modulator block; and a damper tightly coupled to an outer circumferential surface of the ball nut to prevent the ball nut from rotating by being supported in a rotational direction by the bushing member and prevent deviation in the axial direction from the ball nut when the ball nut moves linearly, wherein the ball nut may include one or more fitting grooves formed on an outer circumferential surface thereof in a circumferential direction with a predetermined width, and the damper may include one or more fitting protrusions formed on an inner circumferential surface thereof at positions corresponding to the fitting grooves.

The ball nut may be provided in a hollow cylindrical shape, the ball nut may include one end portion coupled to the damper and the other end portion coupled to the piston, and the fitting grooves may be formed between the one end portion and the other end portion.

A screw groove may be formed on an inner circumferential surface of the ball nut to correspond to a screw thread formed on the outer circumferential surface of the screw, and a ball may be inserted between the screw thread and the screw groove.

The other end of the ball nut may be formed to have an outer diameter smaller than the one end portion and may be coupled to an end portion of the piston.

The damper may be formed in a cylindrical shape having an inner diameter equal to or larger than an outer diameter of one end portion of the ball nut.

The fitting protrusions may be provided in any one of 2 to 8 pieces and may be disposed at predetermined intervals on the inner circumferential surface of the damper.

Preferably, the fitting protrusions may be provided in four pieces and may be disposed at every 90° interval on the inner circumferential surface of the damper.

The bushing member may include a body part formed in a hollow cylindrical shape penetrated vertically and a flange part extending radially outward from the upper end portion of the body part.

A plurality of protrusions protruding from an upper end portion to a lower end portion in a longitudinal direction may be formed on an outer surface of the body part, the plurality of protrusions may be disposed at a predetermined interval along a circumferential direction of the body part, and the plurality of guide grooves may be recessed in positions corresponding to the protrusions on an inner surface of the body part.

The protrusions and the guide grooves may be each provided in four places and may be disposed at each interval of 90° along a circumference of the body part.

At least one guide protrusion protruding outward in a radial direction may be formed on an outer circumferential surface of one end portion coupled to the damper in the ball nut.

The guide protrusions may be formed in a pair and may be symmetrically positioned on the outer circumferential surface of the ball nut.

A slot may be formed on an outer circumferential surface of the damper and the guide protrusion formed on an outer circumferential surface at one end portion of the ball nut may be fitted to the slot to protrude outside the damper.

Specific details of other embodiments are included in "Detail Description" and accompanying "drawings".

Advantages and/or features of the present disclosure, and a method for achieving the advantages and/or features will become obvious with reference to exemplary embodiments to be described below in detail together with the accompanying drawings.

However, the present disclosure is not limited to the exemplary embodiments set forth below, and may be embodied in various different forms. The present embodiments are just for rendering the disclosure of the present disclosure complete and are set forth to provide a complete understanding of the scope of the disclosure to a person with ordinary skill in the technical field to which the present disclosure pertains, and the present disclosure will only be defined by the scope of the claims.

According to the solving means of the problem, the present disclosure has the following effects.

According to the present disclosure, one or more fitting grooves having a predetermined width are formed on the outer circumferential surface of the ball nut along the circumferential direction, and at least one fitting protrusion is formed on the inner circumferential surface of the damper at positions corresponding to the fitting grooves when the damper is coupled to the ball nut. Therefore, by minimizing the movement of the damper, it is possible to suppress vibration and noise caused by a collision with a bushing member generated while the ball nut moves in the axial direction of the screw.

DETAILED DESCRIPTION

Hereinafter, a preferred embodiment of a "coupling structure of a ball nut and a damper and a hydraulic supply apparatus employing the same" according to the present disclosure will be described in detail based on the attached drawings. For reference, the terms and words used in this specification and claims should not be interpreted as limited to ordinary or dictionary meanings, but should be interpreted as meanings and concepts consistent with the technical idea of the present disclosure based on the principle that the inventor can properly define the concept of the term in order to describe his/her own disclosure in the best way. In addition, it should be understood that the embodiments and drawings shown in this specification are only those of the most preferred embodiments of the present disclosure, and not all technical ideas of the present disclosure are representative, so there may be various equivalents and modifications that can replace them at the time of this application.

Figure 1:
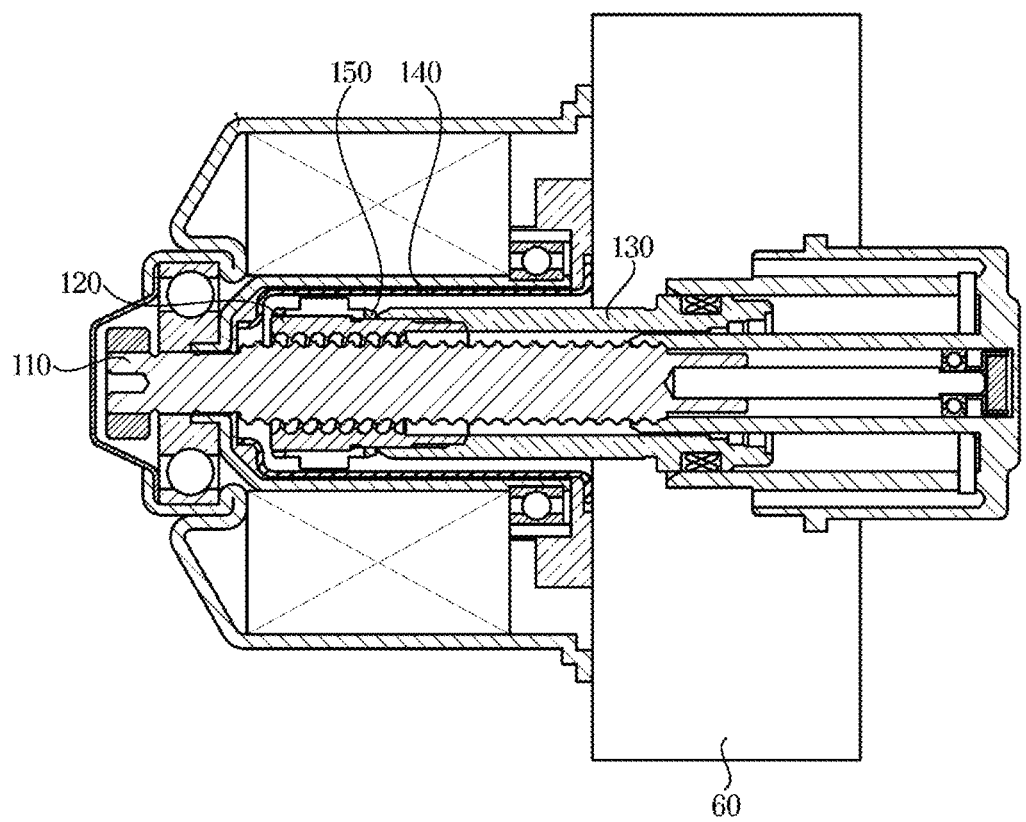
FIG. 1 is a cross-sectional view of one embodiment of a hydraulic supply apparatus according to the related art.
Figure 2:
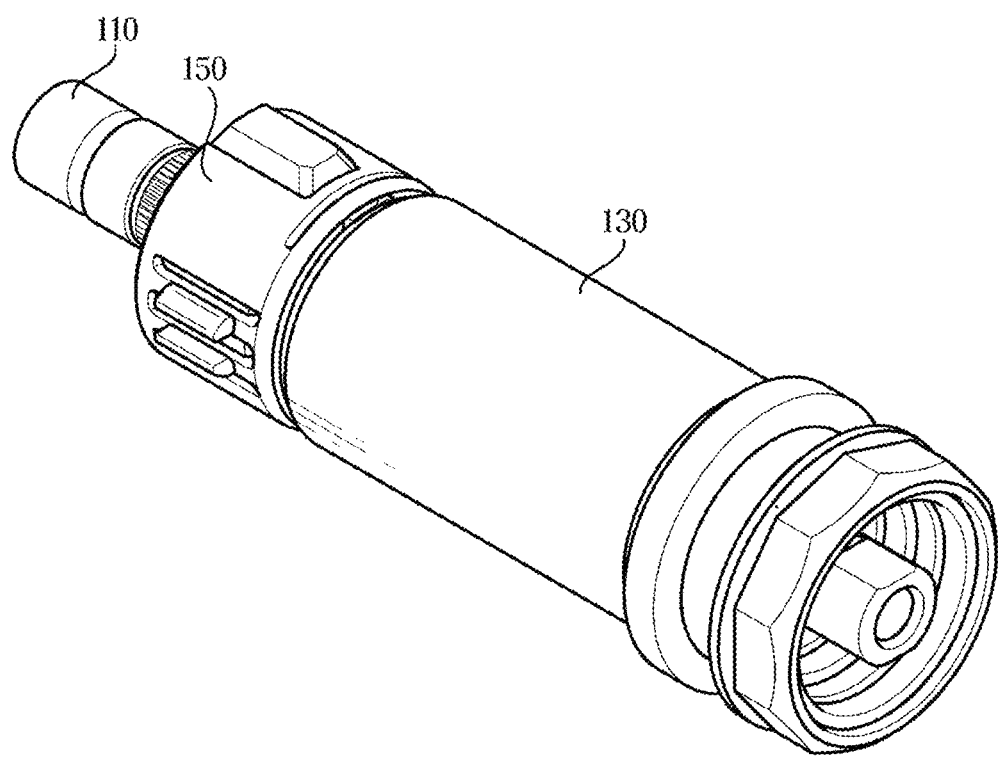
FIG. 2 is a view showing a state in which a screw, a ball nut, a piston, and a rotation prevention member are combined in the hydraulic supply apparatus of FIG. 1.
Figure 3:
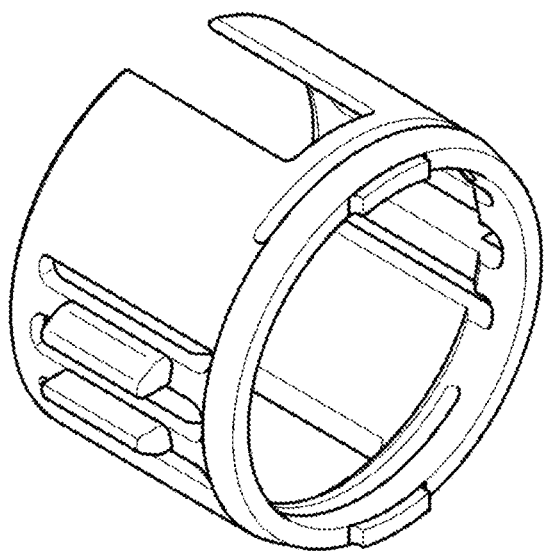
FIG. 3 is a view showing a rotation prevention member in the hydraulic supply apparatus of FIG. 1.
Figure 4:
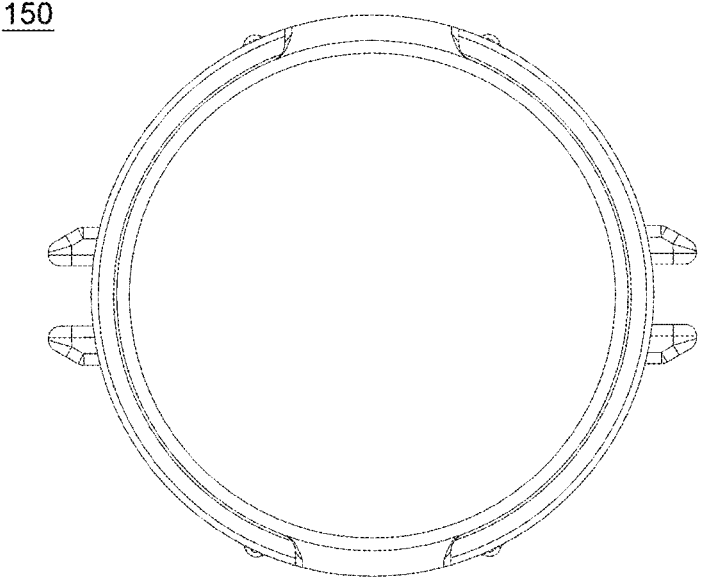
FIG. 4 is a view showing a state in which the rotation prevention member of FIG. 3 is viewed from the front.
Figure 5:
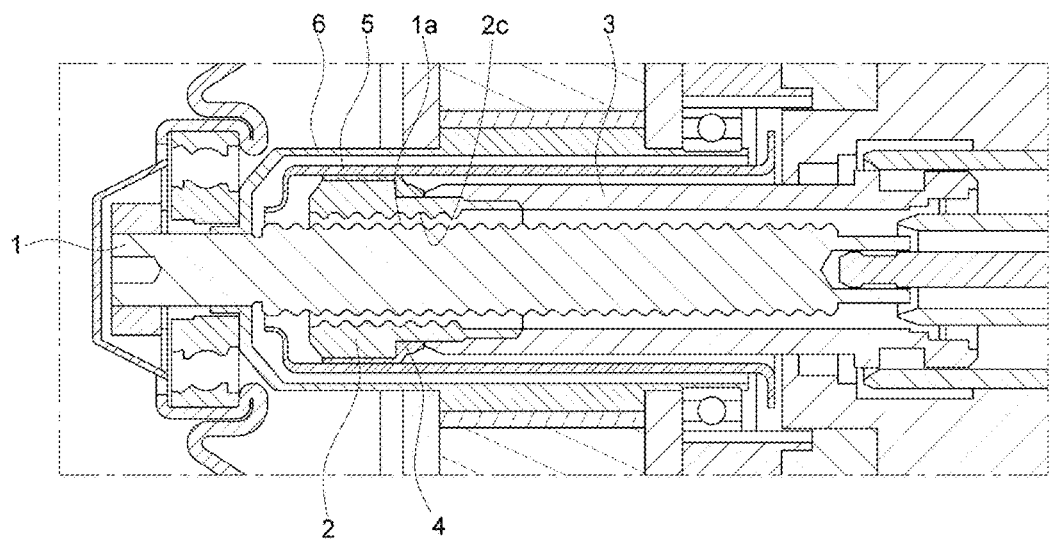
FIG. 5 is a cross-sectional view of one embodiment of a hydraulic supply apparatus according to the present disclosure.

FIG. 5 is a cross-sectional view of one embodiment of a hydraulic supply apparatus according to the present disclosure.

The hydraulic supply apparatus is an apparatus that provides hydraulic pressure from an electronic brake system to a wheel cylinder (not shown).

The hydraulic supply apparatus is coupled to a modulator block (not shown) in which a flow path and valve for controlling braking hydraulic pressure are provided.

This modulator block is a housing for implementing a brake system by regulating braking hydraulic pressure. Such a modulator block includes a plurality of solenoid valves (not shown), an accumulator that temporarily stores oil discharged from the wheel cylinder, and an electronic control unit (ECU) that controls the driving of the solenoid valves and the motor.

In addition, the motor housing and the chamber housing are fastened to both sides of the modulator block. Since the configuration of the motor housing and the chamber housing is described in detail in Korean Patent Publication No. 10-2022-0005909 filed and disclosed by the present applicant, detailed descriptions thereof will be omitted here.

The hydraulic supply apparatus according to the present disclosure includes a screw 1, a ball nut 2, a piston 3, a damper 4, and a bushing member 5.

The screw 1 is provided to be rotatable by receiving the rotational force generated by the motor, and the screw 1 has a screw thread 1a that can be engaged with a screw groove 2c formed in the ball nut 2 to be described later on the outer circumferential surface of the screw 1.

The end portion of the rotor 6 is coupled to the screw 1 to transmit a rotational force to the screw 1 when the rotor 6 rotates to rotate together.

The motor generates rotational force when power is supplied and includes a stator (not shown) that receives power and forms a magnetic field and a rotor 6 that rotates by changes in the magnetic field, and the rotor 6 is arranged to be spaced apart inside the stator.

The ball nut 2 is screwed with the screw 1 to be linearly movable along the axial direction of the screw 1 by the rotation of the screw 1.

The ball nut 2 includes one or more fitting grooves 2b formed on an outer circumferential surface thereof in a circumferential direction with a predetermined width, and the damper 4 includes one or more fitting protrusions 4a formed on an inner circumferential surface thereof at positions corresponding to the fitting grooves 2b.

When a plurality of fitting protrusions 4a are formed on the inner circumferential surface of the damper 4, the fitting protrusions are spaced apart from each other along the circumferential direction.

Accordingly, by minimizing the axial motion of the damper 4, it is possible to suppress vibration and noise caused by collision with the bushing member 5 generated while the ball nut 2 moves in the axial direction of the screw 1.

The piston 3 is coupled to the ball nut 2 to enable linear movement together with the ball nut 2 and provides hydraulic pressure.

The damper 4 is formed of an elastic material such as plastic or rubber. Such a damper 4 is coupled on the outer circumferential surface of the ball nut 2 so as to be in close contact with the ball nut 2 and supported in the rotation direction by the bushing member 5 to prevent the ball nut 2 from rotating and is provided so as not to deviate in the axial direction from the ball nut 2 when the ball nut 2 moves linearly.

The bushing member 5 is provided between the piston 3 and the rotor 6 and has one end portion fixed to the modulator block.

Figure 6:
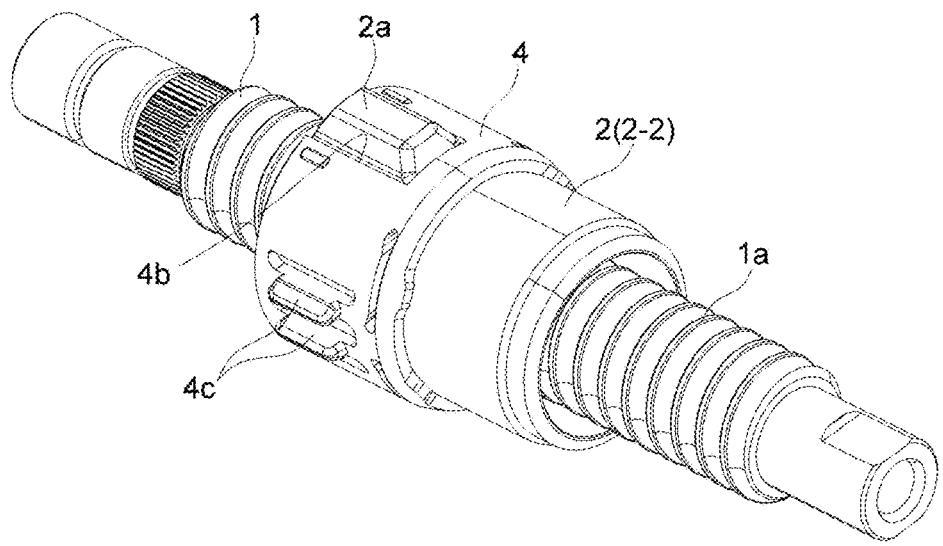
FIG. 6 is a view showing a state in which a screw, a ball nut, a piston, and a damper are combined in the hydraulic supply apparatus of FIG. 5.
Figure 7:
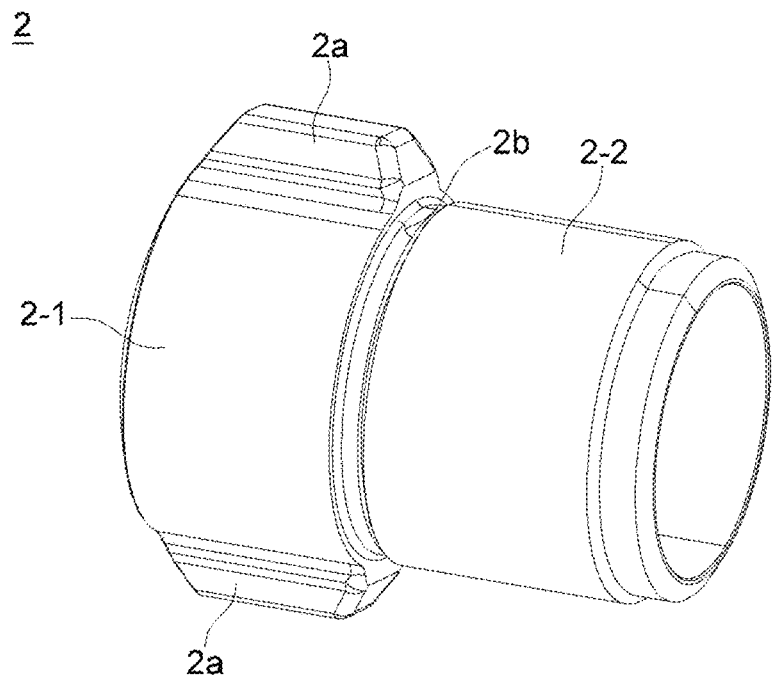
FIG. 7 is a view showing a ball nut in the hydraulic supply apparatus according to the present disclosure.

FIG. 6 is a view showing a state in which a screw, a ball nut, a piston, and a damper are combined in the hydraulic supply apparatus of FIG. 5, and FIG. 7 is a view showing a ball nut in the hydraulic supply apparatus according to the present disclosure.

The fitting grooves 2b having a predetermined width are formed on the outer circumferential surface of the ball nut 2 along the circumferential direction. When the damper 4 is coupled to the ball nut 2, one or more fitting protrusions 4a are formed on the inner circumferential surface of the damper 4 at positions corresponding to the fitting grooves 2b formed in the ball nut 2. When the plurality of fitting protrusions 4a are formed, the fitting protrusions are disposed to be spaced apart from each other along the circumferential direction.

The ball nut 2 is provided in a hollow cylindrical form. The ball nut 2 includes one end portion 2-1 to which the damper 4 is coupled and the other end portion 2-2 to which the piston 3 is coupled. The fitting grooves 2b are formed between the one end portion 2-1 and the other end portion 2-2 of the ball nut 2.

The fitting protrusions 4a are provided in any one of 2 to 8 pieces and are disposed at predetermined intervals on the inner circumferential surface of the damper.

Preferably, the fitting protrusions 4a formed on the inner circumferential surface of the damper 4 are provided in four pieces and are disposed at each interval of 90° on the inner circumferential surface of the damper 4.

As described above, the fitting grooves 2b are formed in the circumferential direction on the outer circumferential surface of the ball nut 2 and the four fitting protrusions 4a are formed on the inner circumferential surface of the damper 4, which is exemplary, and anything may be replaced as long as the movement of the damper 4 in the axial direction can be suppressed.

For example, the plurality of fitting grooves may be formed on the outer circumferential surface of the ball nut 2 to be spaced apart from each other along the circumferential direction, and the fitting protrusions may be formed on the inner circumferential surface of the damper 4 to correspond to the plurality of fitting grooves.

Meanwhile, a screw groove 2c is formed on the inner circumferential surface of the ball nut 2 to correspond to the screw thread 1a formed on the outer circumferential surface of the screw 1. A ball is inserted between the screw thread 1a and the screw groove 2c.

In addition, at least one guide protrusion 2a protruding outward in the radial direction is formed on the outer circumferential surface of one end portion 2-1 of the ball nut 2 to which the damper 4 is coupled. Preferably, the guide protrusions 2a are formed in a pair and are located symmetrically on the outer circumferential surface of the ball nut 2.

Such the guide protrusions 2a are inserted into a guide grooves 5b of the bushing member 5 to be described later.

When the ball nut 2 rotates, the guide protrusions 2a are closely attached to the guide grooves 5b to prevent the ball nut 2 from rotating.

At this time, the width of the guide protrusions 2a are formed to be smaller than the width of the guide grooves 5b and spaced apart from the guide grooves 5b with a fine gap.

Accordingly, the guide protrusions 2a may prevent rotation by contacting the guide grooves 5b only when the ball nut 2 rotates at a predetermined angle or more because a large load occurs in the motor. In normal times, vibration and noise generated during friction between the ball nut 2 and the bushing member 5 can be reduced by reducing friction with the bushing member 5 as much as possible.

In addition, the other end portion 2-2 of the ball nut 2 is formed to have a smaller outer diameter than the one end portion 2-1 and is pressed into and coupled to the end portion of the piston 3.

Figure 8:
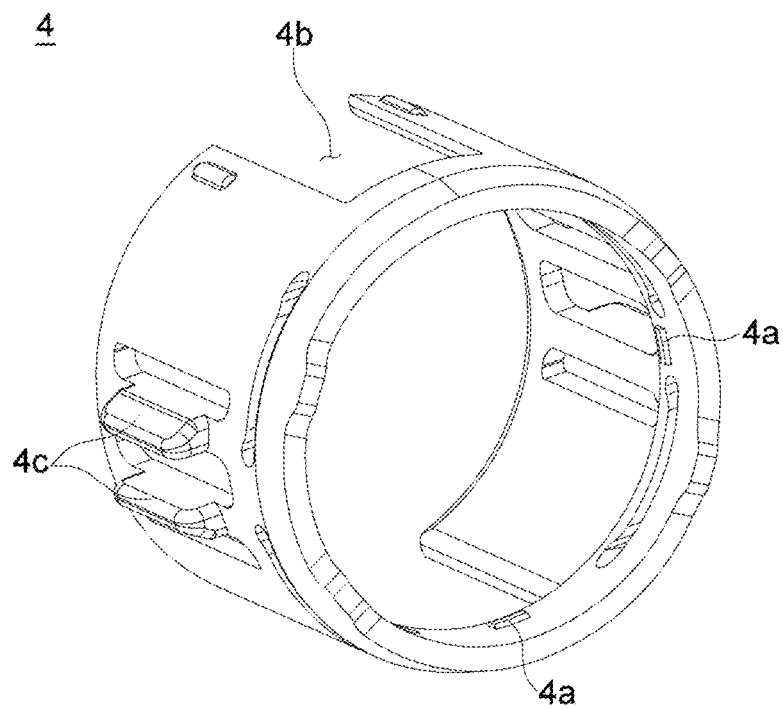
FIG. 8 is a view showing a damper in the hydraulic supply apparatus according to the present disclosure.
Figure 9:
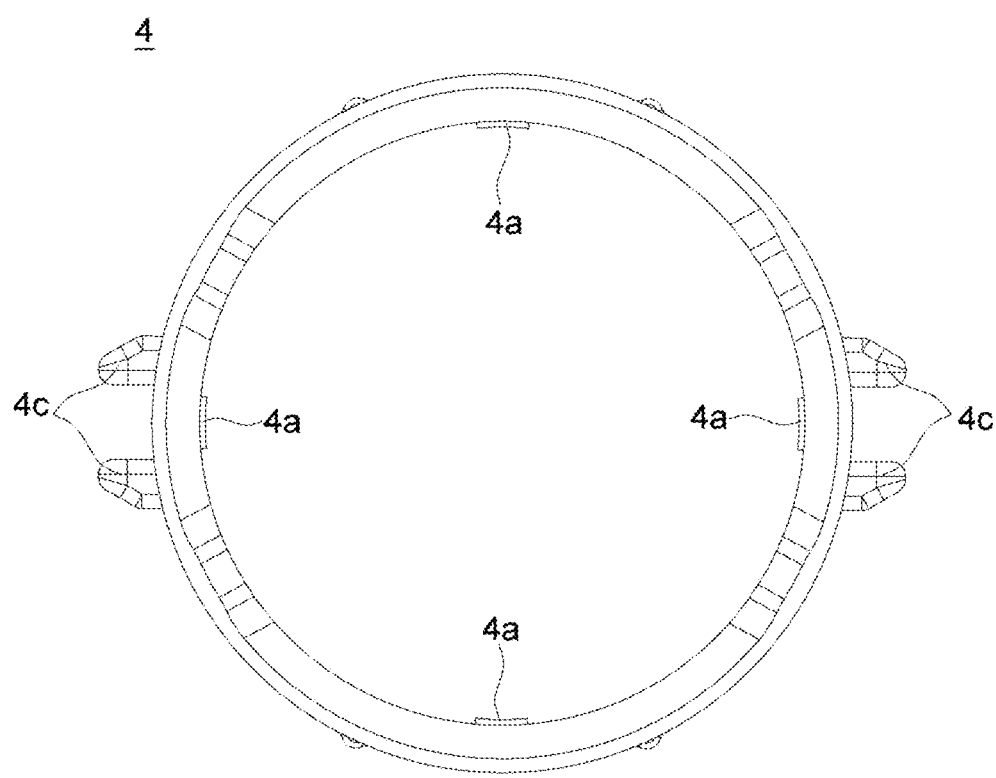
FIG. 9 is a view showing a state in which the damper of FIG. 8 is viewed from the front.

FIG. 8 is a view showing a damper in the hydraulic supply apparatus according to the present disclosure, and FIG. 9 is a view showing a state in which the damper of FIG. 8 is viewed from the front.

The damper 4 is formed in a cylindrical shape and is coupled to the outside of the ball nut 2 to prevent the damper from rotating by the bushing member 5. Accordingly, when the screw 1 is rotated, the ball nut 2 does not rotate together.

The ball nut 2 is inserted into the inner side of the damper 4, and the inner circumferential surface of the damper 4 is closely attached on the outer circumferential surface of the ball nut 2.

Accordingly, it is preferable that the inner diameter of the damper 4 be equal to or greater than the outer diameter of the one end portion 2-1 of the ball nut 2.

In addition, a slot 4b is formed on the outer circumferential surface of the damper 4, and the guide protrusions 2a formed on the outer circumferential surface of the one end portion 2-1 of the ball nut 2 are fitted to the slot to protrude outside the damper 4.

As such, the guide protrusions 2a of the ball nut 2 protruding to the outside through the slot 4b are inserted into the guide grooves 5b formed in the bushing member 5.

In addition, at least one locking protrusion 4c inserted into the guide grooves 5b of the bushing member 5 is formed to protrudes from the outer circumferential surface of the damper 4.

By inserting the locking protrusions 4c into the guide grooves 5b of the bushing member 5 and closely adhering to the guide groove 5b, it is possible to prevent the damper 4 from rotating.

Figure 10:
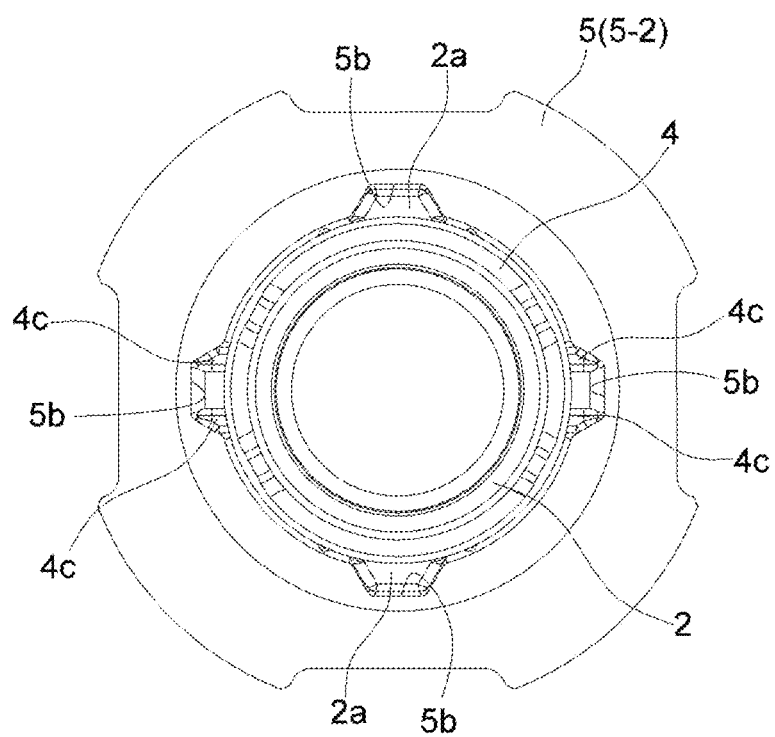
FIG. 10 is a view showing a state in which a ball nut, a damper, and a bushing member are combined in the hydraulic supply apparatus according to the present disclosure.
Figure 11:
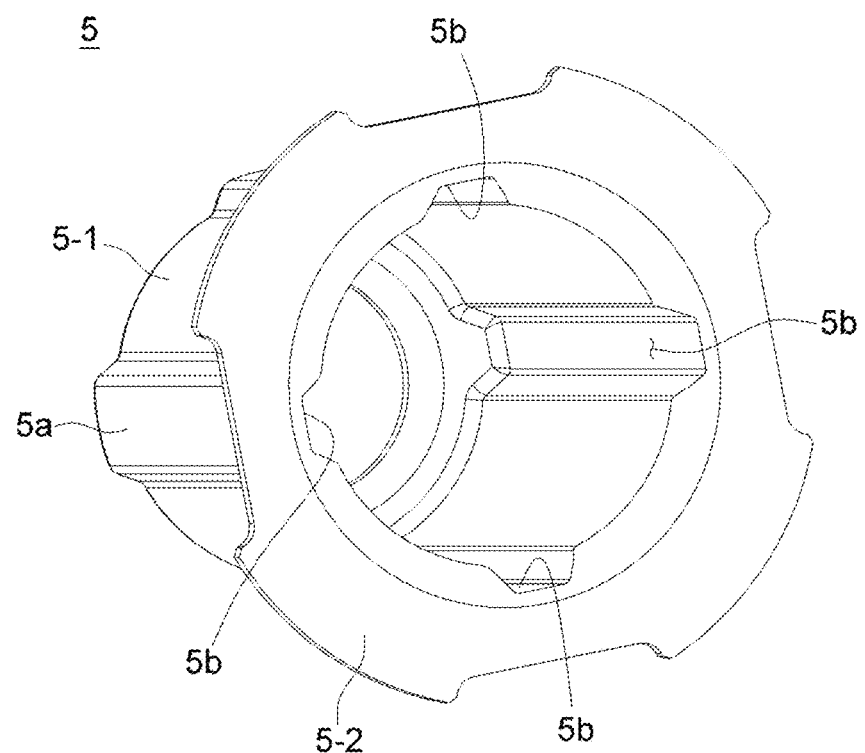
FIG. 11 is a view showing a bushing member in the hydraulic supply apparatus according to the present disclosure.

FIG. 10 is a view showing a state in which a ball nut, a damper, and a bushing member are combined in the hydraulic supply apparatus according to the present disclosure, and FIG. 11 is a view showing a bushing member in the hydraulic supply apparatus according to the present disclosure.

The bushing member 5 includes a body part 5-1 formed in a hollow cylindrical shape penetrated vertically and a flange part 5-2 extending radially outward from an upper end portion of the body part 5-1.

A plurality of protrusions 5a protruding along the longitudinal direction from the upper end portion to the lower end portion are formed on the outer surface of the body part 5-1 of the bushing member 5. The plurality of protrusions 5a are disposed at predetermined intervals along the circumferential direction of the body part 5-1. The plurality of guide grooves 5b are recessed in positions corresponding to the protrusions 5a on the inner surface of the body part 5-1.

The locking protrusions 4c of the damper 4 are inserted in some of the plurality of guide grooves 5b and the guide protrusions 2a of the ball nut 2 are inserted in the remainder thereof.

At this time, the protrusions 5a and the guide grooves 5b of the bushing member 5 are each provided at four places and preferably disposed at a 90° interval along the circumference of the body part 5-1.

As such, in the present disclosure, the fitting grooves 2b having a predetermined width along the circumferential direction are formed on the outer circumferential surface of the ball nut 2, and at least one fitting protrusion 4a is formed on the inner circumferential surface of the damper 4 at a position corresponding to the fitting groove 2b when the damper 4 is coupled to the ball nut 2. Accordingly, by minimizing the movement of the damper 4, and it is possible to suppress vibration and noise caused by the collision with the bushing member 5 generated while the ball nut 2 is moved in the axial direction of the screw 1.

The present disclosure described above is not limited by the above-described embodiments and the accompanying drawings, and it will be apparent to those skilled in the art that various substitutions, modifications, and changes are possible within the scope of the technical idea of the present disclosure.

DESCRIPTION OF SYMBOLS

1: screw
2: ball nut
2a: guide protrusion
2b: fitting groove
3: piston
4: damper
4a: fitting protrusion
4b: slot
4c: locking protrusion
5: bushing member
6: rotor

What is claimed is:

1. A hydraulic supply apparatus comprising:
a screw rotatably provided by receiving a rotational force generated by a motor,
a ball nut threadedly coupled to the screw to move linearly along an axial direction of the screw through rotation of the screw;
a piston coupled to the ball nut to move linearly together with the ball nut to generate hydraulic pressure;
a bushing member provided between the piston and a rotor and having one end portion fixed to a modulator block; and
a damper tightly coupled to an outer circumferential surface of the ball nut to prevent the ball nut from rotating by being supported in a rotational direction by the bushing member and prevent deviation in the axial direction from the ball nut when the ball nut moves linearly,
wherein the ball nut comprises one or more fitting grooves formed on an outer circumferential surface thereof in a circumferential direction with a predetermined width, and the damper comprises one or more fitting protrusions formed on an inner circumferential surface thereof at positions corresponding to the fitting grooves, and
wherein the fitting protrusions are provided in any one of 2 to 8 pieces and are disposed at predetermined intervals on the inner circumferential surface of the damper.

2. The hydraulic supply apparatus of claim 1, wherein the ball nut is provided in a hollow cylindrical shape,
the ball nut includes one end portion coupled to the damper and the other end portion coupled to the piston, and
the one or more fitting grooves are formed between the one end portion and the other end portion.

3. The hydraulic supply apparatus of claim 2, a screw groove is formed on an inner circumferential surface of the ball nut to correspond to a screw thread formed on the outer circumferential surface of the screw, and a ball is inserted between the screw thread and the screw groove.

4. The hydraulic supply apparatus of claim 3, wherein the other end portion of the ball nut is formed to have an outer diameter smaller than the one end portion and is coupled to an end portion of the piston.

5. The hydraulic supply apparatus of claim 3, wherein the damper is formed in a cylindrical shape having an inner diameter equal to or larger than an outer diameter of one end portion of the ball nut.

6. The hydraulic supply apparatus of claim 2, at least one guide protrusion protruding outward in a radial direction is formed on an outer circumferential surface of the ball nut on the one end portion that is coupled to the damper.

7. The hydraulic supply apparatus of claim 6, wherein the guide protrusions are formed in a pair and are symmetrically positioned on the outer circumferential surface of the ball nut.

8. The hydraulic supply apparatus of claim 7, a slot is formed on an outer circumferential surface of the damper and the guide protrusion formed on an outer circumferential surface at one end portion of the ball nut is fitted to the slot to protrudes outside the damper.

9. The hydraulic supply apparatus of claim 1, wherein the fitting protrusions are provided in four pieces and are disposed at every 90° interval on the inner circumferential surface of the damper.

10. The hydraulic supply apparatus of claim 1, wherein the bushing member includes a body part formed in a hollow cylindrical shape penetrated vertically and a flange part extending radially outward from the upper end portion of the body part.

11. The hydraulic supply apparatus of claim 10, a plurality of protrusions protruding from an upper end portion to a lower end portion in a longitudinal direction are formed on an outer surface of the body part, the plurality of protrusions are disposed at a predetermined interval along a circumferential direction of the body part, and
a plurality of guide grooves are recessed in positions corresponding to the protrusions on an inner surface of the body part.

12. The hydraulic supply apparatus of claim 11, wherein the protrusions and the guide grooves are each provided in four places and are disposed at each interval of 90° along a circumference of the body part.

* * * * *